Patented June 4, 1935

2,003,444

UNITED STATES PATENT OFFICE 2,003,444

PROCESS OF PRODUCING AMINO-ARYL-THIAZOLE-COMPOUNDS

Richard Herz, Frankfort-on-the-Main, and Max Schubert, Frankfort-on-the-Main-Fechenheim, Germany, assignors to General Aniline Works, Inc., New York, N. Y., a corporation of Delaware No Drawing. Application June 1, 1931, Serial No. 541,534. In Germany January 26, 1929

5 Claims.  (Cl. 260—44)

This application is a continuation in part of our application Serial Number 423,256, filed January 24, 1930.

The present application relates to the particular use of disulfurdichloride ($S_2Cl_2$) in the process for producing amino-thiazoles of the general formula:

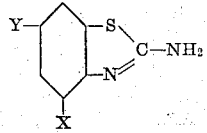

wherein X means hydrogen or methyl, Y means hydrogen or methyl or aralkyl or halogen when starting from the urea-derivatives of the general formula:

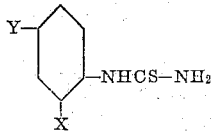

wherein X and Y have the aforesaid signification. In this process disulfurdichloride is a particularly suitable agent for effecting the ring closure.

Whereas Hugershoff only used chloroform as diluent for the action of bromine, it is possible to use for the present process other organic diluents more usual for technical manufacture, such as chlorobenzene, carbon-tetrachloride or glacial acetic acid.

The special improvement involved by our present process consists in the fact that the reaction products are free from by-products which otherwise are formed to some degree by a simultaneous entrance of chlorine atoms into the nucleus of the formed aminothiazole compound. The sulfur formed by the reaction remains either dissolved in the solvent applied or may be removed from the reaction products in the usual manner, for instance it may be separated by filtration from the solution of the hydrochloride of the aminothiazole. The reaction products are then immediately suitable for technical use.

In order to further illustrate our invention the following examples are given, the parts being by weight and all temperatures in centigrade degrees, but it is however to be understood, that our invention is not limited to the particular products nor reacting conditions mentioned therein.

Example 1

5 parts of 4-ethoxy-phenyl-thio-urea (cf. Journal für praktische Chemie, vol. 65, page 379) are suspended in about 50 parts of chlorobenzene and at room temperature while stirring 5.2 parts of disulfurdichloride ($S_2Cl_2$) are added. With weakly warming the components are dissolved. Advantageously the solution is warmed for some hours on the water bath, then the mass is allowed to stand for some hours and the separated precipitate is filtered off and dried. It is dissolved in cold water and by adding a caustic soda solution to the aqueous solution the free 1-amino-5-ethoxy-benzothiazole of the formula:

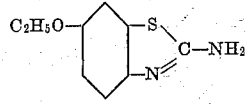

is obtained. It melts when recrystallized from benzene at 160–163°.

Example 2

17 to 20 parts of disulfurdichloride ($S_2Cl_2$) are dissolved in about 70 parts of chlorobenzene and at about 80–90° a suspension of 16.4 parts of 4-methylphenyl-thiourea in 20 to 30 parts of chlorobenzene is allowed to run in. The mixture is then heated for some hours at 80–90°. When cooled down the separated reaction product is filtered off and dried. It is dissolved in cold water, to which advantageously a little quantity of hydrochloric acid has been added. From the solution of the hydrochloride of 5-methyl-1-aminobenzothiazole thus obtained some quantities of separated sulfur are removed by filtration, and the free base is isolated from the solution of the hydrochloride by adding the corresponding amount of for instance a caustic soda solution. The 1-amino-5-methyl-benzothiazole of the formula:

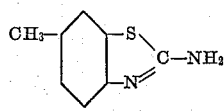

melts in a pure state at 142°.

Example 3

20 parts of 2-methyl-4-chlorophenyl-thiourea are suspended in about 200–250 parts of carbon tetrachloride and to this suspension at room temperature 20–25 parts of disulfurdichloride ($S_2Cl_2$) are added. Then the mixture is heated while well stirring for some hours in an apparatus provided with a reflux condenser. When cool the reaction product is filtered off and converted into the free base in the manner described in the foregoing example. The 1-amino-3-methyl-5-chlorobenzothiazole of the formula:

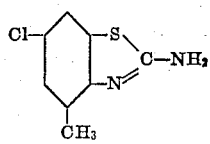

thus obtained melts in a pure state at 203–205°.

*Example 4*

16.4 parts of 2-methyl-phenylthiourea are suspended in about 150 parts of trichloro-ethylene and at room temperature 20–25 parts of disulfurdichloride (S₂Cl₂) are added. Then the mixture is heated for some hours in an apparatus provided with a reflux condenser. When cool the reaction product is filtered off and converted into the free base as described in Example 2. When recrystallized for instance from benzene the 1-amino-3-methyl-benzothiazole of the formula:

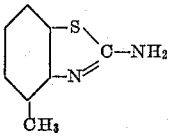

thus formed represents colorless needles of 138° melting point.

We claim:

1. A process for producing amino-thiazole-compounds of the general formula:

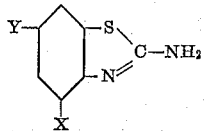

wherein X means hydrogen or methyl, Y means hydrogen, methyl or alkoxy or Y is halogen when X represents methyl, which process comprises acting with disulfurdichloride (S₂Cl₂) on thiourea-derivatives of the general formula:

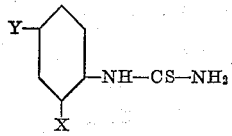

wherein X and Y have the aforesaid signification.

2. A process for producing 3-methyl-5-chloro-1-aminobenzothiazole of the formula:

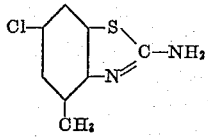

which process comprises acting with disulfurdichloride (S₂Cl₂) on 2-methyl-4-chlorophenyl-thio-urea of the formula:

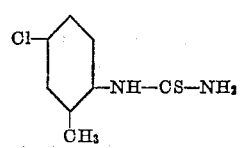

3. A process for producing 5-methyl-1-aminobenzothiazole of the formula:

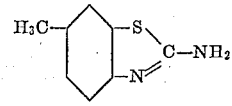

which process comprises acting with disulfurdichloride (S₂Cl₂) on 4-tolylthiourea of the formula:

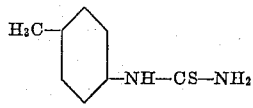

4. A process for producing 5-alkoxy-1-aminobenzothiazole-compounds of the formula:

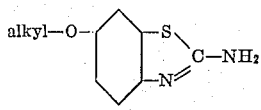

which process comprises acting with sisulfurdichloride (S₂Cl₂) on 4-alkoxyphenyl-thio-urea of the formula:

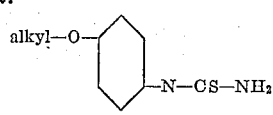

5. A process for producing 5-ethoxy-1-aminobenzothiazole of the formula:

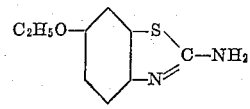

which process comprises acting at room temperature and subsequently on the water bath with 5.2 parts of disulfurdichloride on 5 parts of 4-ethoxy-phenyl-thio-urea in presence of 50 parts of chlorobenzene and isolating the free 2-amino-6-ethoxy-benzothiazole by adding a caustic soda solution to the aqueous solution of the hydrochloride primarily formed.

RICHARD HERZ.
MAX SCHUBERT.